United States Patent
Lee et al.

(10) Patent No.: US 11,246,184 B2
(45) Date of Patent: Feb. 8, 2022

(54) METHOD FOR TRANSMITTING SIGNAL BASED ON COVERAGE ENHANCED LEVEL IN WIRELESS COMMUNICATION SYSTEM AND AN APPARATUS THEREFOR

(71) Applicant: LG Electronics Inc., Seoul (KR)

(72) Inventors: Gyeongcheol Lee, Seoul (KR); Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/965,857

(22) PCT Filed: Mar. 27, 2019

(86) PCT No.: PCT/KR2019/003553
§ 371 (c)(1),
(2) Date: Jul. 29, 2020

(87) PCT Pub. No.: WO2019/194456
PCT Pub. Date: Oct. 10, 2019

(65) Prior Publication Data
US 2021/0059009 A1     Feb. 25, 2021

(30) Foreign Application Priority Data
Apr. 5, 2018   (KR) .................. 10-2018-0040018

(51) Int. Cl.
*H04W 80/02*    (2009.01)
*H04L 1/18*     (2006.01)
*H04W 52/36*    (2009.01)

(52) U.S. Cl.
CPC ............. *H04W 80/02* (2013.01); *H04L 1/189* (2013.01); *H04W 52/365* (2013.01)

(58) Field of Classification Search
None
See application file for complete search history.

(56) References Cited

U.S. PATENT DOCUMENTS

| 2016/0373943 A1 | 12/2016 | Wang et al. |
| 2018/0063722 A1* | 3/2018 | Lee ..................... H04L 1/08 |

(Continued)

FOREIGN PATENT DOCUMENTS

| WO | WO2016167570 | 10/2016 |
| WO | WO2016171445 | 10/2016 |
| WO | WO2017052144 | 3/2017 |

OTHER PUBLICATIONS

LG Electronics Inc., "Access barring for CE level," R2-1803052, 3GPP TSG-RAN WG2 Meeting #101, Athens, Greece, dated Feb. 26-Mar. 2, 2018, 4 pages.

(Continued)

*Primary Examiner* — Anh Vu H Ly
(74) *Attorney, Agent, or Firm* — Fish & Richardson P.C.

(57) ABSTRACT

A method for transmitting signals by a medium access control (MAC) entity of a transmission end in a wireless communication system is disclosed. The method includes steps of receiving a protocol data unit (PDU) from a Radio Link Control (RLC) layer; transmitting a signal including the PDU based on a specific coverage enhanced (CE) level to a network; when a transmission of the signal to a network is failed, determining whether a current CE level is changed or not from the specific CE level; if the current CE level is changed from the specific CE level, transmitting an indication requesting a retransmission of the PDU, to the RLC layer; receiving the PDU from the RLC layer; and transmitting a signal including the PDU based on the current CE level to the network.

10 Claims, 3 Drawing Sheets

(56) References Cited

U.S. PATENT DOCUMENTS

| | | | | |
|---|---|---|---|---|
| 2018/0103419 | A1* | 4/2018 | Lee | H04W 72/085 |
| 2018/0324866 | A1* | 11/2018 | Lee | H04W 76/27 |
| 2019/0014561 | A1* | 1/2019 | Takeda | H04J 11/00 |
| 2019/0306667 | A1* | 10/2019 | Kim | H04B 17/27 |
| 2020/0059835 | A1* | 2/2020 | Kim | H04W 36/0058 |
| 2021/0037347 | A1* | 2/2021 | Kim | H04W 76/11 |
| 2021/0051732 | A1* | 2/2021 | Choe | H04B 17/318 |
| 2021/0153032 | A1* | 5/2021 | Li | H04W 28/06 |

OTHER PUBLICATIONS

LG Electronics Inc., "Regenerating a MAC PDU for Msg3 to change PH reporting," R2-1806073, 3GPP TSG-RAN WG2 Meeting #101bis, Sanya, China, dated Apr. 16-20, 2018, 5 pages.

LG Electronics Inc., "Regenerating a MAC PDU for Msg3 to change PH reporting," R2-1806075, 3GPP TSG-RAN2 Meeting #101bis, Sanya, China, dated Apr. 16-20, 2018, 3 pages.

PCT International Search Report and Written Opinion in International Application No. PCT/KR2019/003553, dated Jul. 10, 2019, 10 pages.

* cited by examiner

(A) Control-plane protocol stack (B) User-plane protocol stack

METHOD FOR TRANSMITTING SIGNAL BASED ON COVERAGE ENHANCED LEVEL IN WIRELESS COMMUNICATION SYSTEM AND AN APPARATUS THEREFOR

CROSS-REFERENCE TO RELATED APPLICATIONS

This application is a National Stage application under 35 U.S.C. § 371 of International Application No. PCT/KR2019/003553, filed on Mar. 27, 2019, which claims the benefit of Korean Application No. 10-2018-0040018, filed on Apr. 5, 2018. The disclosures of the prior applications are incorporated by reference in their entirety.

TECHNICAL FIELD

The present invention relates to a wireless communication system and, more particularly, to a method for transmitting a signal based on a coverage enhanced (CE) level in a wireless communication system and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

Figure 1:
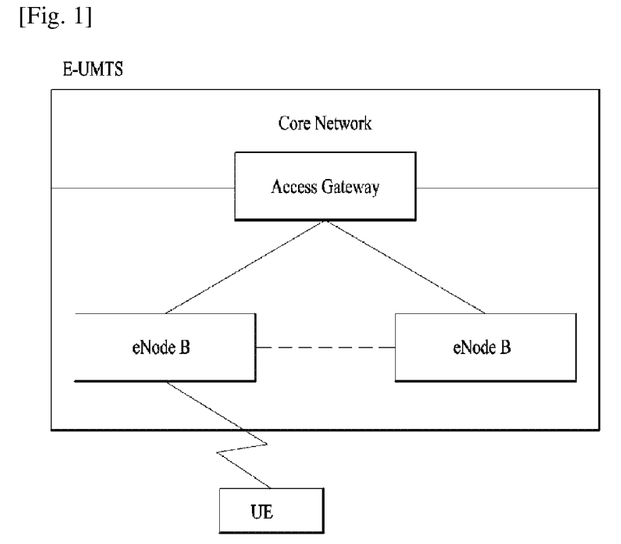
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARM)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE OF INVENTION

Technical Problem

Based on the above discussion, the present invention proposes a method for transmitting a signal based on a coverage enhanced (CE) level in a wireless communication system and an apparatus therefor.

Solution to Problem

In accordance with an embodiment of the present invention, a method for transmitting signals by a medium access control (MAC) entity of a transmission end in a wireless communication system includes receiving a protocol data unit (PDU) from a Radio Link Control (RLC) layer; transmitting a signal including the PDU based on a specific coverage enhanced (CE) level to a network; when a transmission of the signal to a network is failed, determining whether a current CE level is changed or not from the specific CE level; if the current CE level is changed from the specific CE level, transmitting an indication requesting a retransmission of the PDU, to the RLC layer; receiving the PDU from the RLC layer; and transmitting a signal including the PDU based on the current CE level to the network.

Further, in accordance with another embodiment of the present invention, An apparatus for wireless communications comprising a radio frequency (RF) module; a memory; and at least one processor coupled to the memory and the RF module, wherein the at least one processor is configured to receive a protocol data unit (PDU) from a Radio Link Control (RLC) layer, control the RF module for transmitting a signal including the PDU based on a specific coverage enhanced (CE) level to a network, determine whether a current CE level is changed or not from the specific CE level when a transmission of the signal to a network is failed, transmit an indication requesting a retransmission of the PDU, to the RLC layer if the current CE level is changed from the specific CE level, receive the PDU from the RLC layer, and control the RF module for transmitting a signal including the PDU based on the current CE level to the network.

Especially, a power headroom value indicated by a power headroom report corresponding to the current CE level is different from that of the specific CE level.

Preferably, if the current CE level is changed from the specific CE level, flushing the PDU stored in a buffer.

Preferably, if the current CE level is not changed from the specific CE level, retransmitting the signal including the PDU stored in a buffer to the network.

More preferably, wherein, when the RLC layer receives the indication from the MAC layer, if a transmission opportunity indicated by the MAC layer is a first transmission opportunity after receiving the indication from the MAC layer, the RLC layer submits the PDU to the MAC layer.

It is to be understood that both the foregoing general description and the following detailed description of the present invention are exemplary and explanatory and are intended to provide further explanation of the invention as claimed.

Advantageous Effects of Invention

According to embodiments of the present invention, the CE mode can be applied to the wireless communication system efficiently with multiple first threshold values for cell reselection.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

BEST MODE FOR CARRYING OUT THE INVENTION

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2:
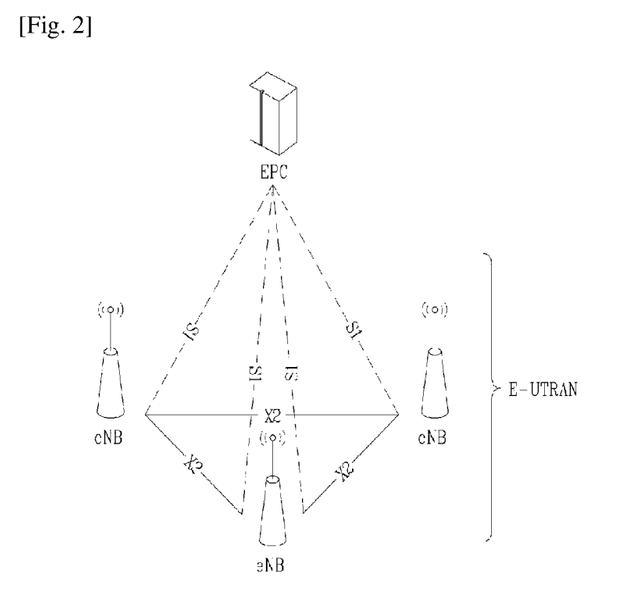
FIG. 2 is a diagram showing the concept of a network structure of an Evolved Universal Terrestrial Radio Access Network (E-UTRAN).

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes cells (eNBs) and cells are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

Figure 3:
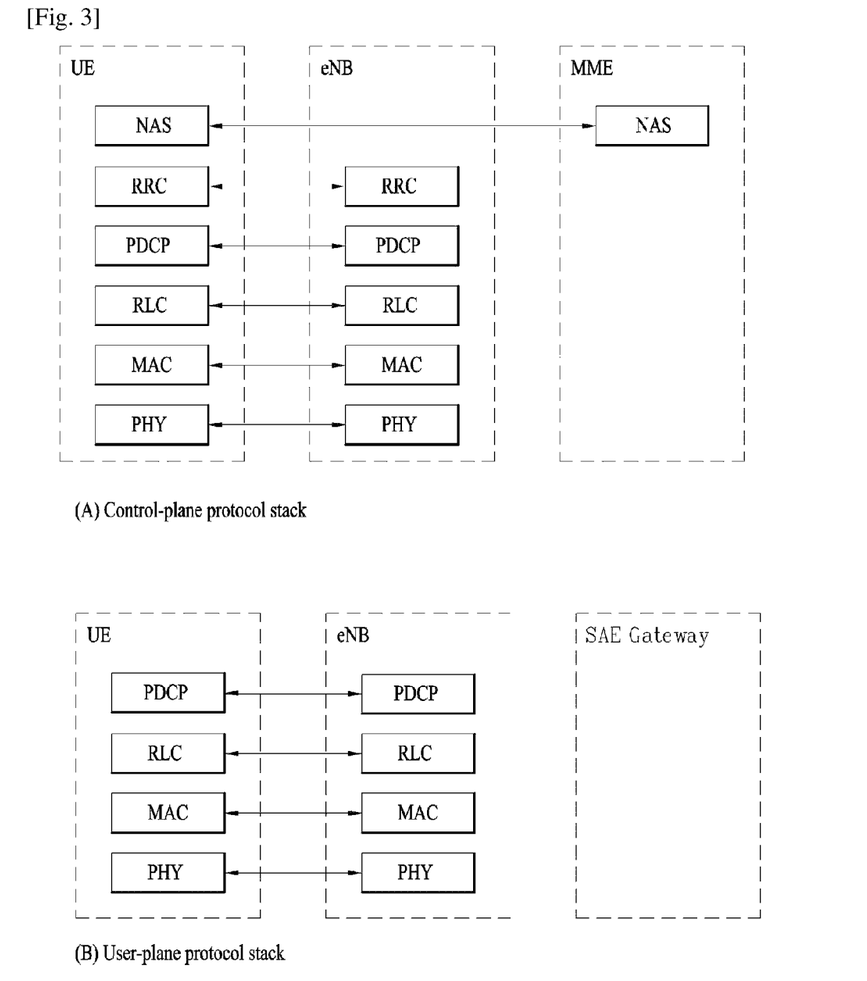
FIG. 3 is a diagram showing a control plane and a user plane of a radio interface protocol between a User Equipment (UE) and an Evolved Universal Terrestrial Radio Access Network (E-UTRAN) based on a 3rd Generation Partnership Project (3GPP) radio access network standard.

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A medium access control (MAC) layer, a radio link control (RLC) layer and a packet data convergence protocol (PDCP) layer may be located in a second layer. The MAC layer of the second layer serves to map various logical channels to various transport channels. The MAC layer performs a logical channel multiplexing function for mapping several logical channels to one transport channel. The MAC layer is connected to a Radio Link Control (RLC) layer, which is a higher layer, via a logical channel, and the logical channel may be roughly divided into a control channel for transmitting information about the control plane and a traffic channel for transmitting information about the user plane, according to the type of transmitted information.

The RLC layer of the second layer segments and concatenates data received from a higher layer, thereby controlling a data size suitable for enabling a lower layer to transmit data in a radio interval. The RLC layer provides three modes, namely, a transparent mode (TM), an unacknowledged mode (UM) and an acknowledged mode (AM) to support a variety of QoS requested by each radio bearer (RB). Especially, for reliable data transmission, the AM RLC performs a function to retransmit data through automatic repeat request (ARQ).

The packet data convergence protocol (PDCP) layer of the second layer performs a header compression function for reducing the size of an IP packet header which is relatively great in size and includes unnecessary control information in order to efficiently transmit IP packets, such as IPv4 or IPv6 packets, in a radio interval with a relatively narrow bandwidth. Accordingly, only necessary information need be included in the header part of data for transmission, so as to increase transmission efficiency of a radio interval. In the LTE system, the PDCP layer also performs a security function. The security function includes a ciphering function for preventing data monitoring from a third party, and an integrity protection function for preventing third party data manipulation.

A radio resource control (RRC) layer of the third layer is defined only in the control plane. The RRC layer handles logical channels, transport channels and physical channels for the configuration, re-configuration and release of radio bearers (RBs). Here, a radio bearer (RB) denotes a service provided by the second layer for data transfer between the UE and the network. The RRC layers of the UE and the network exchange RRC messages with each other.

The RB may be broadly divided into two bearers, that is, a signaling radio bearer (SRB) used to transmit an RRC message on a control plane and a data radio bearer (DRB) used to transmit user data on a user plane. The DRB may be divided into a UM DRB using UM RLC and AM DRB using AM RLC according to method for operating RLC.

Hereinafter, an RRC state of a UE and an RRC connection method will be described. The RRC state, which indicates whether the RRC layer of the UE is logically connected to the RRC layer of the E-UTRAN, is called an RRC_CONNECTED state if the RRC layers are connected and is called an RRC_IDLE state if the RRC layers are not connected.

Since the E-UTRAN detects presence of a UE in an RRC_CONNECTED state in cell units, it is possible to efficiently control the UE. In contrast, the E-UTRAN cannot detect a UE in an RRC_IDLE state in cell units and a core network (CN) manages the UE in an RRC_IDLE state in units of TA which is greater than a cell. That is, the UE in the RRC_IDLE state transitions to the RRC_CONNECTED state in order to receive a service such as voice or data from a cell.

In particular, when a user first turns a UE on, the UE searches for an appropriate cell and then camps on an RRC_IDLE state in the cell. The UE in the RRC_IDLE state performs an RRC connection establishment process with the RRC layer of the E-UTRAN to transition to the RRC_CONNECTED state when RRC connection needs to be established. The RRC connection needs to be established when uplink data transmission is necessary due to call connection attempt of a user, when a response message is transmitted in response to a paging message received from the E-UTRAN, etc.

A non-access stratum (NAS) layer located above the RRC layer performs a function such as session management and mobility management. In the NAS layer, two states such as an EPS mobility management-REGISTERED (EMM-REGISTERED) state and an EMM-UNREGISTERED state are defined in order to manage mobility of a UE. These two states are applied to the UE and the MME. A UE is first in the EMM-UNREGISTERED state and performs a process of registering with a network through an initial attach procedure in order to access the network. If the attach procedure is successfully performed, the UE and the MME enter the EMM-REGISTERED STATE.

In the NAS layer, in order to manage signaling connection between the UE and the EPC, an EPS connection management (ECM)-IDLE state and an ECM_CONNECTED state are defined and applied to the UE and the MME. If a UE in the ECM-IDLE state is RRC_connected to the E-UTRAN, the UE enters the ECM-CONNECTED state. If the MME in the ECM-IDLE state is S1 connected to the E-UTRAN, the MME enters the ECM-CONNECTED state.

When the UE is in the ECM-IDLE state, the E-UTRAN does not have context information of the UE. Accordingly, the UE in the ECM-IDLE state performs a UEbased mobility associated procedure, such as cell selection or reselection, without receiving a command of the network. In contrast, if the UE is in the ECM-CONNECTED state, mobility of the UE is managed by the command of the network. If the location of the UE is changed in the ECM-IDLE state, the UE informs the network of the location thereof via a tracking area (TA) update procedure.

In an LTE system, one cell configuring an eNB is configured to use a bandwidth such as 1.25, 2.5, 5, 10, 15 or 20 MHz to provide a downlink or uplink transmission service to several UEs. Different cells may be configured to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
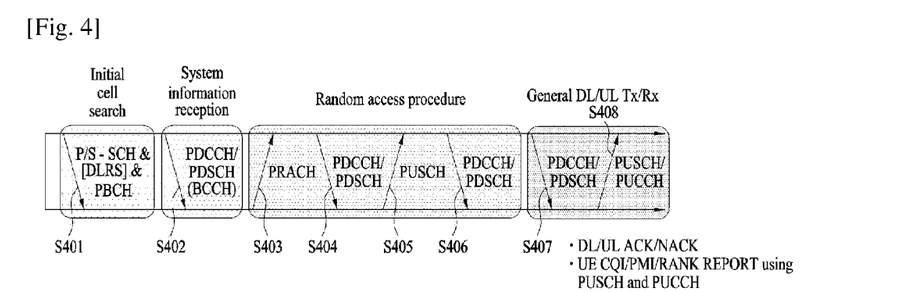
FIG. 4 is a diagram showing physical channels used in a 3GPP system and a general signal transmission method using the same.

FIG. 4 is a diagram showing physical channels used in a 3GPP system and a general signal transmission method using the same.

A UE performs an initial cell search operation such as synchronization with an eNB when power is turned on or the UE enters a new cell (S401). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which has completed the initial cell search may receive a Physical Downlink Control Channel (PDCCH) and a Physical Downlink Shared Channel (PDSCH) according to information included in the PDCCH so as to acquire more detailed system information (S402).

Meanwhile, if the eNB is initially accessed or radio resources for signal transmission are not present, the UE may perform a Random Access Procedure (RACH) (step S403 to S406) with respect to the eNB. In this case, the UE may transmit a specific sequence through a Physical Random Access Channel (PRACH) as a preamble (S403), and receive a response message to the preamble through the PDCCH and the PDSCH corresponding thereto (S404). In case of contention based RACH, a contention resolution procedure may be further performed.

The UE which has performed the above procedures may perform PDCCH/PDSCH reception (S407) and Physical Uplink Shared Channel PUSCH)/Physical Uplink Control Channel (PUCCH) transmission (S408) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In case of the 3GPP LTE system, the UE may transmit the control information such as CQI/PMI/RI through the PUSCH and/or the PUCCH.

Figure 5:
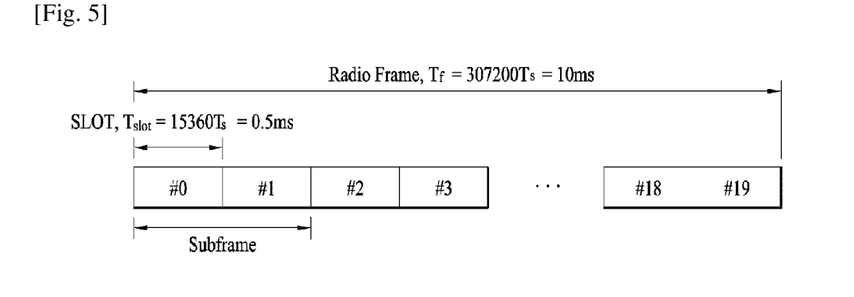
FIG. 5 is a diagram showing the structure of a radio frame used in a Long Term Evolution (LTE) system.

FIG. 5 is a diagram showing the structure of a radio frame used in a Long Term Evolution (LTE) system.

Referring to FIG. 5, the radio frame has a length of 10 ms (327200?Ts) and includes 10 subframes with the same size. Each subframe has a length of 1 ms and includes two slots. Each slot has a length of 0.5 ms (15360?Ts). Ts denotes a sampling time, and is represented by Ts=1/(15 kHz?2048)= 3.2552×$10^8$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Hereinafter, a cell selection and cell reselection process will be described.

When a UE is powered on, the UE needs to select a cell having appropriate quality and to perform preparation procedures for receiving a service. An RRC_IDLE UE should always select appropriate quality and prepare to receive a service from the cell. For example, a UE which has just been turned on should select a cell having appropriate quality in order to perform registration with a network. When an RRC_CONNECTED UE enters an RRC_IDLE state, the UE should select a cell on which the UE will camp in the RRC_IDLE state. A process of, at a UE, selecting a cell satisfying a specific condition in order to camp on the cell in a service standby state such as an RRC_IDLE state is referred to as cell selection. Since the cell selection is performed in a state in which the UE does not determine a cell on which the UE camps in the RRC_IDLE state, it is important to select a cell as fast as possible. Accordingly, a cell which provides radio signal quality equal to or greater than a predetermined reference may be selected in the cell selection process of the UE, even if the cell does not provide the best radio signal quality to the UE.

When the UE selects a cell satisfying a cell selection reference, the UE receives information necessary for an operation of the RRC_IDLE UE in the cell from the system information of the cell. The UE receives all information necessary for the operation of the RRC_IDLE UE and then requests a service from a network or awaits reception of a service from the network in a RRC_IDLE state.

After the UE selects a certain cell in the cell selection process, the intensity or quality of a signal between the UE and the eNB may be changed due to mobility of the UE or wireless environment change. Accordingly, when the quality of the selected cell deteriorates, the UE may select another cell which provides better quality. When the cell is reselected, a cell which provides better signal quality than a currently selected cell is generally selected. Such a process is referred to as cell reselection. The cell reselection process is performed in order to select a cell which provides the best quality to the UE from the viewpoint of the quality of the radio signal. In addition to the quality of the radio signal, the network may set a priority per frequency and inform the UE of the priority. The UE which receives the priority preferentially takes the priority into consideration, rather than the radio signal quality.

Hereinafter, a random access procedure will be described in greater detail. The UE may perform a random access procedure in the following cases:

when the UE performs initial access because RRC connection with the eNB is not established, when the UE initially accesses a target cell in a handover procedure, when the random access procedure is requested by a command of a base station, when uplink data transmission is performed in a situation in which uplink time synchronization is not performed or in a situation in which specific radio resources used for requesting radio resources are not allocated, and when a recovery procedure is performed in case of a radio link failure or a handover failure.

In the LTE system, a non-contention based random access procedure of, at an eNB, allocating a dedicated random access preamble to a specific UE and, at the UE, performing the random access procedure using the random access preamble is provided. In other words, there are two procedures in selection of a random access preamble: one is a contention based random access procedure in which the UE randomly selects one preamble within a specific group for use, another is a non-contention based random access procedure in which a random access preamble allocated only to a specific UE by the eNB is used. The above-described random access procedures are performed differently in contention occurring due to competition as will be described below. The non-contention based random access procedure may be used, as described above, only in the handover procedure or when the random access procedure is requested by the eNB.

In the contention based random access procedure, the UE randomly selects one random access preamble from a set of random access preambles indicated via system information or a handover command and selects and transmits PRACH resources for transmitting the random access preamble.

The UE attempts to receive a random access response thereof within a random access response reception window indicated by the eNB via system information or a handover command, after transmitting the random access preamble. More specifically, the random access response information is transmitted in the form of a MAC PDU and the MAC PDU is delivered via a PDSCH. In addition, in order to enable the UE to appropriately receive the information delivered via the PDSCH, a PDCCH is also delivered. That is, the PDCCH includes information about the UE which will receive the PDSCH, frequency and time information of radio resources of the PDSCH and a transmission format of the PDSCH.

Once the UE has successfully received the PDCCH, the UE appropriately receives the random access response transmitted via the PDSCH according to the information about the PDCCH. The random access response includes a random access preamble identifier, uplink grant, a temporary cell identifier (C-RNTI) and timing advance commands (TACs). The reason why the random access preamble identifier is necessary is because random access response information for one or more UEs is included in one random access response and thus for which UE the uplink grant, temporary C-RNTI and TACs are valid should be indicated. The random access preamble identifier matches the random access preamble selected by the UE.

If the UE has received a valid random access response, the UE processes information included in the random access response. That is, the UE applies the TAC and stores the temporary C-RNTI. In addition, the UE transmits data stored in the buffer of the UE or newly generated data to the eNB using the uplink grant. The identifier of the UE is necessarily included in data included in the uplink grant. In the contention based random access procedure, the eNB cannot determine which UE performs the random access procedure. However, for future contention resolution, the UE should be identified. In addition, there are two methods including the identifier of the UE.

In the first method, if a UE has a valid cell identifier allocated by a cell before the random access procedure, the UE transmits a cell identifier thereof in uplink. In contrast, if the UE is not allocated a valid cell identifier before the random access procedure, the UE transmits a unique identifier (e.g., S-TMSI or random id). In general, the unique identifier is longer than the cell identifier. If the UE transmits data via the UL grant, a contention resolution timer starts.

The UE transmits data including the identifier thereof via the uplink grant included in the random access response and then waits for an instruction of the eNB for contention resolution. That is, in order to receive a specific message, the UE attempts to receive a PDCCH. The method of receiving the PDCCH includes two methods. As described above, if the identifier transmitted via the uplink grant is a cell identifier, the UE attempts to receive the PDCCH using the cell identifier and, if the identifier is a unique identifier, the UE attempts to receive the PDCCH using the temporary C-RNTI included in the random access response.

Thereafter, in the former case, if the PDCCH is received via the cell identifier before the contention resolution timer has elapsed, the UE determines that the random access procedure has been normally performed and completes the random access procedure. In the latter case, if the PDCCH is received via the temporary cell identifier before the contention resolution timer has elapsed, data delivered via the PDSCH indicated by the PDCCH is checked. If the unique identifier of the UE is included in the data, the UE determines that the random access procedure has been normally performed and completes the random access procedure.

Additionally, unlike the contention based random access procedure, in the non-contention based random access procedure, when the random access response information is received, the UE determines that the random access procedures has been normally performed and completes the random access procedure.

As described above, the non-contention based random access procedure may be performed in a handover process or when the random access procedure is requested by a command of the eNB. Of course, the contention based random access procedure may be performed in a handover process or when the random access procedure is requested by a command of the eNB. First, for the non-contention based random access procedure, it is important to receive, from the eNB, a predetermined random access preamble which does not cause contention. In the method of receiving the random access preamble, a handover command and a PDCCH command may be used. The UE receives the random access preamble allocated thereto from the eNB and then transmits the preamble to the eNB.

The method of receiving the random access response information is equal to that of the contention based random access procedure.

Hereinafter, a Buffer Status reporting (BSR) procedure is explained.

The Buffer Status reporting procedure is used to provide the serving eNB with information about the amount of data available for transmission in the UL buffers associated with the MAC entity. RRC controls BSR reporting by configuring the three timers periodicBSR-Timer, retxBSR-Timer and logicalChannelSR-ProhibitTimer and by, for each logical channel, optionally signalling logicalChannelGroup which allocates the logical channel to an logical channel group (LCG).

For the Buffer Status reporting procedure, the MAC entity shall consider all radio bearers which are not suspended and may consider radio bearers which are suspended. For NB-IoT the Long BSR is not supported and all logical channels belong to one LCG.

A Buffer Status Report (BSR) shall be triggered if any of the following events occur:

1) UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

2) UL resources are allocated and number of padding bits is equal to or larger than the size of the Buffer Status Report MAC control element plus its subheader, in which case the BSR is referred below to as "Padding BSR";

3) retxBSR-Timer expires and the MAC entity has data available for transmission for any of the logical channels which belong to a LCG, in which case the BSR is referred below to as "Regular BSR";

4) periodicBSR-Timer expires, in which case the BSR is referred below to as

"Periodic BSR".

For Regular BSR, if the BSR is triggered due to data becoming available for transmission for a logical channel for which logicalChannelSR-Prohibit is configured by upper layers, the logicalChannelSR-ProhibitTimer is started or re-started. If else, when the logicalChannelSR-Prohibit-Timer is running, the the logicalChannelSR-ProhibitTimer should be stopped.

For Regular and Periodic BSR, if more than one LCG has data available for transmission in the TTI where the BSR is transmitted, the Long BSR is reported. If else, the Short BSR is reported.

For Padding BSR, when the number of padding bits is equal to or larger than the size of the Short BSR plus its subheader but smaller than the size of the Long BSR plus its subheader, if more than one LCG has data available for transmission in the TTI where the BSR is transmitted: it is report Truncated BSR of the LCG with the highest priority logical channel with data available for transmission. If else, the Short BSR is reported. However, else if the number of padding bits is equal to or larger than the size of the Long BSR plus its subheader, the Long BSR is reported.

For NB-IoT or BL UEs, if rai-Activation is configured, and a buffer size of zero bytes has been triggered for the BSR, and the UE may have more data to send or receive in the near future, any pending BSR is cancelled.

When the Buffer Status reporting procedure determines that at least one BSR has been triggered and not cancelled, if the MAC entity has UL resources allocated for new transmission for this TTI, the Multiplexing and Assembly procedure to generate the BSR MAC control element(s) is intructed, periodicBSR-Timer is started or restarted except when all the generated BSRs are Truncated BSRs, and retxBSR-Timer is started or re-started Else if a Regular BSR has been triggered and logicalChannelSR-ProhibitTimer is not running, when an uplink grant is not configured or the Regular BSR was not triggered due to data becoming available for transmission for a logical channel for which logical channel SR masking (logicalChannelSR-Mask) is setup by upper layers, a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The MAC entity shall restart retxBSR-Timer upon indication of a grant for transmission of new data on any UL-SCH.

All triggered BSRs shall be cancelled in case the UL grant(s) in this TTI can accommodate all pending data available for transmission but is not sufficient to additionally accommodate the BSR MAC control element plus its subheader. All triggered BSRs shall be cancelled when a BSR is included in a MAC PDU for transmission.

The MAC entity shall transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

A Padding BSR is not allowed to cancel a triggered Regular/Periodic BSR, except for NB-IoT. A Padding BSR is triggered for a specific MAC PDU only and the trigger is cancelled when this MAC PDU has been built.

The Data Volume and Power Headroom (DPR) reporting procedure is only applicable for NB-IoT UEs and is used to provide the serving eNB with information about the amount of data available for transmission in the UL buffers associated with the MAC entity, and to provide the serving eNB with information about the difference between the nominal UE maximum transmission power and the estimated transmission power for UL-SCH transmission for the Serving Cell. The reporting is done using the DPR MAC control element, which is sent in Msg3 together with a CCCH SDU.

In the LTE system, if contention resolution fails, a UE restarts with preamble transmission and retransmits the Msg3 in the Msg3 buffer after receiving RAR successfully. In this case, a completely same Msg3 would be retransmitted because Msg3 is comprised of only CCCH (Common Control Channel) SDU, i.e. RRC message.

However, in NB-IoT, Msg3 contains CCCH SDU with Data Volume and Power Headroom (DPR) MAC CE. As current 3GPP specification, the content of DPR MAC CE in Msg3 is determined when Msg3 is constructed after receiving first successful RAR reception during RA procedure and never be changed until Msg3 buffer is flushed.

This means that if Msg3 is generated in CE level 0 and the Msg3 is successfully transmitted at the other CE level, e.g. CE level 1, 2 or 3, the content of Power Headroom in DPR MAC CE would indicate wrong information because separate Power headroom report mapping tables for CE level 0 and CE level other than 0 is defined as shown in below tables 1 and 2. Tables 1 represents PHR mapping for UE category NB1 when the CE level 0 is selected during random access procedure. Further, Tables 2 represents NB-IOT PHR mapping in enhanced coverage when the CE level other than 0 is selected during random access procedure.

TABLE 1

| Reported Value | Measured quantity value (dB) |
| --- | --- |
| POWER_HEADROOM_0 | $-54 \leq PH < 5$ |
| POWER_HEADROOM_1 | $5 \leq PH < 8$ |
| POWER_HEADROOM_2 | $8 \leq PH < 11$ |
| POWER_HEADROOM_3 | $PH \geq 11$ |

TABLE 2

| Reported Value | Measured quantity value (dB) |
| --- | --- |
| POWER_HEADROOM_0 | $-54 \leq PH < -10$ |
| POWER_HEADROOM_1 | $-10 \leq PH < -2$ |
| POWER_HEADROOM_2 | $-2 \leq PH < 6$ |
| POWER_HEADROOM_3 | $PH \geq 6$ |

To resolve this problem, the MAC PDU for Msg3 should be re-generated. However, it is impossible to update a specific field once a MAC PDU is assembled and the only way is to regenerate a MAC PDU.

Therefore, the present invention suggests that when the transmitting RLC entity receives an indication from lower layer (i.e. MAC), if the transmission opportunity indicated by lower layer (i.e. MAC) is the first transmission opportunity after receiving the indication from lower layer (i.e. MAC), the transmitting RLC entity transmits the last submitted RLC PDU. The present invention can be applied to any type of UE, e.g., MTC UE, NB-IoT UE, normal UE.

The transmitting RLC entity can be a transmitting acknowledgement mode (AM) RLC entity, a transmitting UM RLC entity or a transmitting TM RLC entity.

The transmitting RLC entity may receive an indication from lower layer (i.e. MAC), when one of the followings occurred:

a MAC CE in a MAC PDU needs to be changed; or
enhanced coverage (CE) level is changed; or
contention resolution is failed; or
transmission of a MAC PDU, which contains an UMD PDU or a TMD PDU, is failed.

The transmission opportunity is indicated by lower layer (i.e. MAC), when uplink grant is received from one of Random Access Response (RAR), Configured uplink grant, or Dynamic uplink grant.

Further, The maxNumPreambleAttemptCE is configured by the network via RRC signaling. The maxNumPreambleAttemptCE is configured when a MAC entity is established. The maxNumPreambleAttemptCE is the maximum number of preamble transmission attempts per CE level supported in the Serving Cell.

A MAC entity manages the PREAMBLE_TRANSMISSION_COUNTER_CE for a CE level to count how many preamble transmissions are performed at the CE level.

When a Random Access Response reception is considered not successful after transmitting preamble, if the UE is in an enhanced coverage, the MAC entity increments PREAMBLE_TRANSMISSION_COUNTER_CE by 1.

When a value of PREAMBLE_TRANSMISSION_COUNTER_CE is equal to maxNumPreambleAttemptCE for the corresponding CE level, a MAC entity resets PREAMBLE_TRANSMISSION_COUNTER_CE to initial value. If it is supported by the Serving Cell and the UE, the MAC entity considers to be in the next CE level and indicates that CE level is changed to upper layer.

When the transmitting RLC entity receives an indication from lower layer (i.e. MAC), if the transmission opportunity indicated by lower layer (i.e. MAC) is the first transmission opportunity after receiving the indication from lower layer (i.e. MAC), the transmitting RLC entity shall transmit the last submitted RLC PDU which has been submitted. If else, the transmitting RLC entity shall transmit the new RLC PDU which has not been submitted.

Hereinafter, one example of the present invention is disclosed. Especially, it is assumed that a value of the maxNumPreambleAttemptCE is equal to 2, PREAMBLE_TRANSMISSION_COUNTER_CE is 0 and a MAC entity is in CE level 0. A transparent mode data (TMD) PDU does not have sequence number (SN), but in this example, it is assumed that the TMD PDU has SN to explain the example easily.

1. The transmitting MAC entity transmits a Random Access Preamble (RAP) and a Random Access Response (RAR) reception is considered successful and then indicates a transmission opportunity (i.e. RLC).

2. The transmitting RLC entity transmits an TMD PDU with SN1 after receiving the transmission opportunity indicated by the transmitting MAC entity.

3. The transmitting MAC entity generates Msg3 with a MAC CE which contains the TMD PDU with SN1 and transmits Msg3 to the eNB.

4. The contention resolution is failed and the transmitting MAC entity waits for back off time.

5. The transmitting MAC entity transmits a RAP after back off time and a RAR reception is considered not successful. In this case, the transmitting MAC entity increments PREAMBLE_TRANSMISSION_COUNTER_CE by 1, i.e. PREAMBLE_TRANSMISSION_COUNTER_CE is 1.

6. Next, the transmitting MAC entity waits for back off time.

7. Then, the transmitting MAC entity transmits a RAP after back off time and a RAR reception is considered not successful. Similary, the transmitting MAC entity increments PREAMBLE_TRANSMISSION_COUNTER_CE by 1, i.e. PREAMBLE_TRANSMISSION_COUNTER_CE is 2. Further, the transmitting MAC entity resets PREAMBLE_TRANSMISSION_COUNTER_CE to 0 because the maxNumPreambleAttemptCE is equal to PREAMBLE_TRANSMISSION_COUNTER_CE.

Further, the transmitting MAC entity indicates to upper layer that CE level is changed from CE level 0 to CE level 1 because the maxNumPreambleAttemptCE is equal to PREAMBLE_TRANSMISSION_COUNTER_CE.

8. The transmitting MAC entity waits for back off time.

9. The transmitting MAC entity transmits a RAP after back off time and a RAR reception is considered successful and then indicates a transmission opportunity to upper layer (i.e. RLC).

10. transmitting RLC entity transmits the TMD PDU with SN1 after receiving the transmission opportunity indicated by the transmitting MAC entity because the TMD PDU with SN1 is the last submitted TMD PDU.

11. Finally, the transmitting MAC entity generates a new Msg3 with a new MAC CE which contains the TMD PDU with SN1, i.e., the new Msg3 contains the same TMD PDU but MAC CE is new, and then transmits the new Msg3 with the new MAC CE to the eNB.

Figure 6:
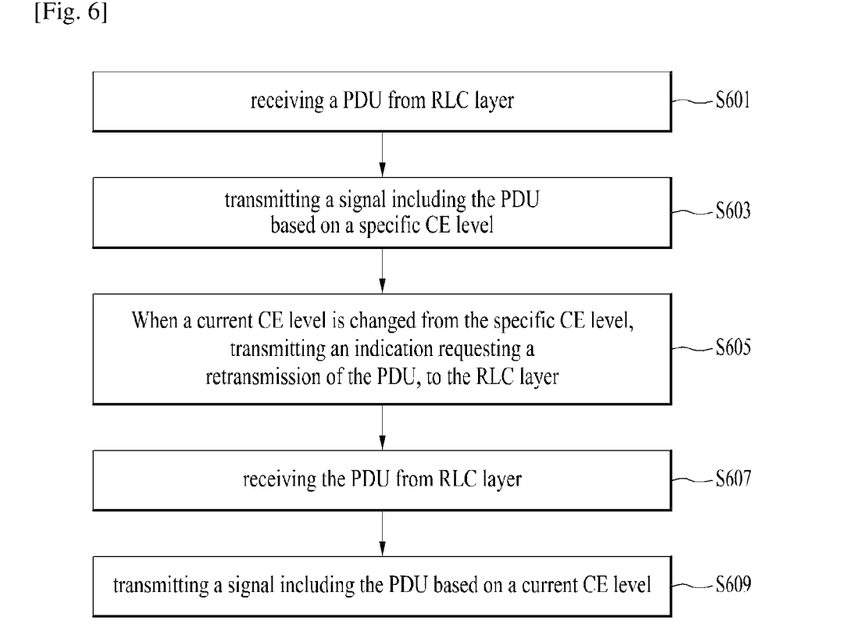
FIG. 6 shows a flow chart for transmitting signals by a medium access control (MAC) entity of a transmission end in a wireless communication system according to an embodiment of the present application.

FIG. 6 shows a flow chart for transmitting signals by a medium access control (MAC) entity of a transmission end in a wireless communication system according to an embodiment of the present application.

Referring to FIG. 6, the MAC entity receives a protocol data unit (PDU) from a Radio Link Control (RLC) layer in S601. Then, the MAC entity transmits a signal including the PDU based on a specific coverage enhanced (CE) level to a network in S603.

However, when a transmission of the signal to a network is failed, the MAC entity should determine whether a current coverage enhanced (CE) level is changed or not from the specific CE level. If the current CE level is changed from the specific CE level, the MAC entity should transmit an indication requesting a retransmission of the PDU, to the RLC layer in S605. Then, in S607, the MAC entity receives the PDU again from the RLC layer, and then transmits a signal including the PDU based on the current CE level to the network in S609. Preferably, if the current CE level is changed from the specific CE level, the MAC entity flushes the PDU stored in a buffer.

While, if the current CE level is not changed from the specific CE level, the MAC entity should re-transmit the signal including the PDU stored in a buffer to the network.

Figure 7:
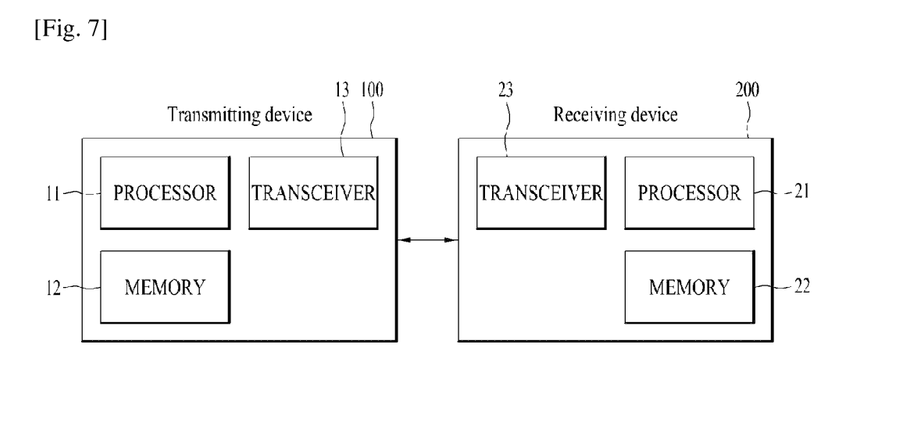
FIG. 7 is a block diagram illustrating an example of elements of a transmitting device 100 and a receiving device 200 according to some implementations of the present disclosure.

FIG. 7 is a block diagram illustrating an example of elements of a transmitting device 100 and a receiving device 200 according to some implementations of the present disclosure.

The transmitting device 100 and the receiving device 200 respectively include transceivers 13 and 23 capable of transmitting and receiving radio signals carrying information, data, signals, and/or messages, memories 12 and 22 for storing information related to communication in a wireless communication system, and processors 11 and 21 operationally connected to elements such as the transceivers 13 and 23 and the memories 12 and 22 to control the elements and configured to control the memories 12 and 22 and/or the transceivers 13 and 23 so that a corresponding device may perform at least one of the above-described implementations of the present disclosure.

The memories 12 and 22 may store programs for processing and controlling the processors 11 and 21 and may temporarily store input/output information. The memories 12 and 22 may be used as buffers. The buffers at each protocol layer (e.g. PDCP, RLC, MAC) are parts of the memories 12 and 22.

The processors 11 and 21 generally control the overall operation of various modules in the transmitting device and the receiving device. Especially, the processors 11 and 21 may perform various control functions to implement the present disclosure. For example, the operations occurring at the protocol stacks (e.g. PDCP, RLC, MAC and PHY layers) according to the present disclosure may be performed by the processors 11 and 21. The protocol stacks performing operations of the present disclosure may be parts of the processors 11 and 21.

The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. The present disclosure may be implemented using firmware or software, and the firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the transceiver 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transceiver 13 may include an oscillator. The transceiver 13 may include Nt (where Nt is a positive integer) transmission antennas.

A signal processing process of the receiving device 200 is the reverse of the signal processing process of the transmitting device 100. Under control of the processor 21, the transceiver 23 of the receiving device 200 receives radio signals transmitted by the transmitting device 100. The transceiver 23 may include Nr (where Nr is a positive integer) receive antennas and frequency down-converts each signal received through receive antennas into a baseband signal. The processor 21 decodes and demodulates the radio signals received through the reception antennas and restores data that the transmitting device 100 intended to transmit.

The transceivers 13 and 23 include one or more antennas. An antenna performs a function for transmitting signals processed by the transceivers 13 and 23 to the exterior or receiving radio signals from the exterior to transfer the radio signals to the transceivers 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An transceiver supporting a MIMO function of transmitting and receiving data using a plurality of antennas may be connected to two or more antennas. The transceivers 13 and 23 may be referred to as radio frequency (RF) units.

In the implementations of the present disclosure, a UE operates as the transmitting device 100 in UL and as the receiving device 200 in DL. In the implementations of the present disclosure, a BS operates as the receiving device 200 in UL and as the transmitting device 100 in DL. Hereinafter, a processor, a transceiver, and a memory included in the UE will be referred to as a UE processor, a UE transceiver, and a UE memory, respectively, and a processor, a transceiver, and a memory included in the BS will be referred to as a BS processor, a BS transceiver, and a BS memory, respectively.

The UE processor can be configured to operate according to the present disclosure, or control the UE transceiver to receive or transmit signals according to the present disclosure. The BS processor can be configured to operate according to the present disclosure, or control the BS transceiver to receive or transmit signals according to the present disclosure.

The processor 11 (at a UE and/or at a BS) checks whether there is a UL grant or DL assignment for a serving cell in a time unit. If there is a UL grant or DL assignment for the serving cell in the time unit, the processor 11 checks whether a data unit is actually present on the UL grant or DL assignment in the time unit, in order to determine whether to restart a deactivation timer associated with the serving cell which has been started. The processor 11 restarts the deactivation timer associated with the serving cell in the time unit if there is a data unit present on the UL grant or DL assignment in the time unit. The processor 11 does not restart the deactivation timer associated with the serving cell in the time unit if there is no data unit present on the UL grant or DL assignment in the time unit, unless another condition that the processor 11 should restart the deactivation timer is satisfied. The processor 11 does not restart the deactivation timer associated with the serving cell in the time unit if there is no data unit present on the UL grant or DL assignment in the time unit and if an activation command for activating the serving cell is not present in the time unit. The processor 11 may be configured to check whether a data unit is actually present on the UL grant or DL assignment on the serving cell in the time unit in order to determine whether to restart the deactivation timer of the serving cell, if the UL grant or DL assignment is a configured grant/assignment which is configured by RRC to occur periodically on the serving cell. The processor 11 may be configured to check whether a data unit is actually present on the UL grant or DL assignment on the serving cell in the time unit in order to determine whether to restart the deactivation timer of the serving cell, if the UL grant or the DL assignment is a dynamic grant/assignment which is indicated by a PDCCH. The processor 11 may be configured to check whether a data unit is actually present on the UL grant or DL assignment on the serving cell in the time unit in order to determine whether to restart the deactivation timer of the serving cell, if the serving cell is a SCell of the UE. The processor 11 (at the UE and/or the BS) deactivates the serving cell upon expiry of the deactivation timer associated with the serving cell.

As described above, the detailed description of the preferred implementations of the present disclosure has been given to enable those skilled in the art to implement and practice the disclosure. Although the disclosure has been described with reference to exemplary implementations, those skilled in the art will appreciate that various modifications and variations can be made in the present disclosure without departing from the spirit or scope of the disclosure described in the appended claims. Accordingly, the disclosure should not be limited to the specific implementations described herein, but should be accorded the broadest scope consistent with the principles and novel features disclosed herein.

INDUSTRIAL APPLICABILITY

While the above-described method for transmitting a signal based on a coverage enhanced (CE) level in a wireless communication system m has been described centering on an example applied to the 3GPP LTE system, the present invention is applicable to a variety of wireless communication systems in addition to the 3GPP LTE system.

The invention claimed is:

1. A method for performing transmissions by a medium access control (MAC) entity of a transmission end in a wireless communication system, the method comprising:
   receiving, from a Radio Link Control (RLC) entity, a protocol data unit (PDU);
   transmitting, to a network, the PDU based on a specific coverage enhanced (CE) level;
   based on a transmission of the PDU to a network failing, determining whether a current CE level is changed or not from the specific CE level;
   based on the current CE level being changed from the specific CE level, transmitting, to the RLC entity, an indication requesting a retransmission of the PDU;
   receiving the PDU from the RLC entity; and
   transmitting, to the network, the PDU based on the current CE level.

2. The method of claim 1, further comprising:
   if the current CE level is changed from the specific CE level, flushing the PDU stored in a buffer.

3. The method of claim 1, further comprising:
   if the current CE level is not changed from the specific CE level, re-transmitting the PDU stored in a buffer to the network.

4. The method of claim 1, wherein a power headroom value indicated by a power headroom report corresponding to the current CE level is different from a power headroom value corresponding to the specific CE level.

5. The method of claim 1, wherein, when the RLC layer receives the indication from the MAC entity, the RLC entity submits the PDU to the MAC entity if a transmission opportunity indicated by the MAC entity is a first transmission opportunity after receiving the indication from the MAC entity.

6. A user equipment (UE) in a wireless communication system, the UE comprising:
   at least one transceiver;
   at least one processor; and
   at least one computer memory operably connectable to the at least one processor and storing instructions that, when executed, cause the at least one processor to perform, by a medium access control (MAC) entity of the UE, operations comprising:
   receiving, from a Radio Link Control (RLC) entity of the UE, a protocol data unit (PDU);
   transmitting, to a network, the PDU based on a specific coverage enhanced (CE) level;
   based on a transmission of the PDU to a network failing, determining whether a current CE level is changed or not from the specific CE level;
   based on the current CE level being changed from the specific CE level, transmitting, to the RLC entity, an indication requesting a retransmission of the PDU;
   receiving the PDU from the RLC entity; and
   transmitting, to the network, the PDU based on the current CE level.

7. The UE of claim 6, wherein the operations further comprise flushing the PDU stored in a buffer is flushed if the current CE level is changed from the specific CE level.

8. The UE of claim 6, wherein the operations further comprise re-transmitting the PDU stored in a buffer to the network if the current CE level is not changed from the specific CE level.

9. The UE of claim 6, wherein a power headroom value indicated by a power headroom report corresponding to the current CE level is different from a power headroom value corresponding to the specific CE level.

10. The UE of claim 6, wherein, when the RLC layer receives the indication from the MAC entity, the RLC entity submits the PDU to the MAC entity if a transmission opportunity indicated by the MAC entity is a first transmission opportunity after receiving the indication from the MAC entity.

* * * * *